US012681231B1

<table>
<tr><td>(12)</td><td><b>United States Patent</b><br>Chiu</td><td>(10) <b>Patent No.:</b></td><td><b>US 12,681,231 B1</b></td></tr>
<tr><td></td><td></td><td>(45) <b>Date of Patent:</b></td><td><b>Jul. 14, 2026</b></td></tr>
</table>

(54) BACKLIGHT MODULE

(71) Applicant: Chicony Power Technology Co., Ltd., New Taipei City (TW)

(72) Inventor: Chen-Hao Chiu, New Taipei City (TW)

(73) Assignee: Chicony Power Technology Co., Ltd., New Taipei City (TW)

( * ) Notice: Subject to any disclaimer, the term of this patent is extended or adjusted under 35 U.S.C. 154(b) by 0 days.

(21) Appl. No.: 19/385,181

(22) Filed: Nov. 11, 2025

(30) Foreign Application Priority Data

Aug. 12, 2025 (TW) ................................. 114130759

(51) Int. Cl.
 *F21V 8/00* (2006.01)

(52) U.S. Cl.
 CPC ........... *G02B 6/006* (2013.01); *G02B 6/0036* (2013.01); *F21V 2200/20* (2015.01)

(58) Field of Classification Search
 CPC .... G02B 6/006; G02B 6/0036; F21V 2200/20
 See application file for complete search history.

(56) References Cited

U.S. PATENT DOCUMENTS 6,144,424 A   11/2000  Okuda et al.
10,126,485 B2  11/2018  Stevenson et al.

2010/0142183 A1*  6/2010  Lerenius .............. G02B 6/0003
                                                         362/85
2018/0373945 A1   12/2018  Wu et al.
2025/0251098 A1*  8/2025  Lin ........................ G02B 6/006

FOREIGN PATENT DOCUMENTS

<table>
<tr><td>TW</td><td>201044434 A</td><td>12/2010</td></tr>
<tr><td>TW</td><td>M490060 U</td><td>11/2014</td></tr>
<tr><td>TW</td><td>I522690 B</td><td>2/2016</td></tr>
<tr><td>TW</td><td>201804303 A</td><td>2/2018</td></tr>
<tr><td>TW</td><td>I617848 B</td><td>3/2018</td></tr>
<tr><td>TW</td><td>M571515 U</td><td>12/2018</td></tr>
<tr><td>TW</td><td>201919897 A</td><td>6/2019</td></tr>
<tr><td>TW</td><td>I707267 B</td><td>10/2020</td></tr>
<tr><td>TW</td><td>202102987 A</td><td>1/2021</td></tr>
<tr><td>TW</td><td>202324765 A</td><td>6/2023</td></tr>
</table>

* cited by examiner

*Primary Examiner* — Sean P Gramling
(74) *Attorney, Agent, or Firm* — CKC & Partners Co., LLC

(57) ABSTRACT

A backlight module includes a circuit board, a light guide layer, a light-emitting module, a light-shielding layer, a cover plate, a first light-filtering layer, and a second light-filtering layer. The light guide layer is disposed over the circuit board and includes a microstructure group. The light-emitting module is disposed on the circuit board and is configured to emit a first wavelength light and a second wavelength light. The light-shielding layer is disposed over the light-emitting module and has a first hollowed portion. The first light-filtering layer is disposed between the light-shielding layer and the cover plate and has a second hollowed portion. The second light-filtering layer is disposed between the light-shielding layer and the cover plate and has a third hollowed portion.

20 Claims, 5 Drawing Sheets

1

BACKLIGHT MODULE

CROSS-REFERENCE TO RELATED APPLICATION

This application claims priority to Taiwan Application Serial Number 114130759 filed Aug. 12, 2025, which is herein incorporated by reference in its entirety.

BACKGROUND

Field of Invention

The present disclosure relates to a backlight module.

Description of Related Art

In general, in order to present two panel display modes (dual modes) in a backlight module (for example, a backlight touch panel), two light-emitting units, two light guide layers, and light-blocking partitions are usually disposed in the backlight module. By disposing the two light guide layers and appropriately blocking light with the partitions, it is possible to achieve an effect in which one light-emitting unit illuminates only one of the light guide layers and the other light-emitting unit illuminates only the other light guide layer, thereby realizing dual modes in one backlight module. However, such a double light guide layer structure cannot save space of the entire backlight module.

Therefore, how to propose a backlight module that can solve the aforementioned problems is one of the problems that the industry is currently eager to invest in research and development resources to solve.

SUMMARY

In view of this, one purpose of the present disclosure is to provide a backlight module that can solve the aforementioned problems.

In order to achieve the above objective, according to an embodiment of the present disclosure, a backlight module includes a circuit board, a light guide layer, a light-emitting module, a light-shielding layer, a cover plate, a first light-filtering layer, and a second light-filtering layer. The light guide layer is disposed over the circuit board and includes a microstructure group. The light-emitting module is disposed on the circuit board and is configured to emit a first wavelength light and a second wavelength light. The light-shielding layer is disposed over the light-emitting module and has a first hollowed portion disposed corresponding to the microstructure group. The cover plate is disposed over the light-shielding layer. The first light-filtering layer is disposed between the light-shielding layer and the cover plate and has a second hollowed portion corresponding to the microstructure group. The second light-filtering layer is disposed between the light-shielding layer and the cover plate and has a third hollowed portion corresponding to the microstructure group. The first wavelength light is guided by the microstructure group and passes upward through the first hollowed portion, the third hollowed portion, and the first light-filtering layer to emit from the cover plate. Or the second wavelength light is guided by the microstructure group and passes upward through the first hollowed portion, the second light-filtering layer, and the second hollowed portion to emit from the cover plate.

In one or more embodiments of the present disclosure, the first light-filtering layer is configured to block the second wavelength light from passing through, and the second light-filtering layer is configured to block the first wavelength light from passing through.

In one or more embodiments of the present disclosure, the second hollowed portion presents a first pattern, and the third hollowed portion presents a second pattern, and wherein the first hollowed portion presents one of: the first pattern; the second pattern; and a third pattern composed of at least a union of the first pattern and the second pattern.

In one or more embodiments of the present disclosure, the light guide layer has a through hole configured to accommodate the light-emitting module.

In one or more embodiments of the present disclosure, the backlight module further includes a light reflective layer disposed between the circuit board and the light guide layer.

In one or more embodiments of the present disclosure, the microstructure group is located at a side of the light guide layer close to the light reflective layer.

In one or more embodiments of the present disclosure, the light-emitting module includes a first light-emitting element and a second light-emitting element. The first light-emitting element emits the first wavelength light, and the second light-emitting element emits the second wavelength light.

In one or more embodiments of the present disclosure, the first light-filtering layer and the second light-filtering layer are a light-filtering film or a light-filtering coating coated on the cover plate.

In one or more embodiments of the present disclosure, a wavelength of the first wavelength light and a wavelength of the second wavelength light are completely staggered.

In one or more embodiments of the present disclosure, a wavelength of the first wavelength light is within a range between 580 nanometers and 780 nanometers, and a wavelength of the second wavelength light is within a range between 435 nanometers and 579 nanometers.

In order to achieve the above objective, according to an embodiment of the present disclosure, a backlight module includes a circuit board, a light guide layer, a light-emitting module, a light-shielding layer, a cover plate, a first light-filtering layer, and a second light-filtering layer. The light guide layer is disposed over the circuit board and includes a microstructure group. The light-emitting module is disposed on the circuit board and is configured to emit a first wavelength light and a second wavelength light. The light-shielding layer is disposed over the light-emitting module and has a first hollowed portion disposed over the microstructure group. The cover plate is disposed over the light-shielding layer. The first light-filtering layer is disposed between the light-shielding layer and the cover plate and has a second hollowed portion over the microstructure group. The second light-filtering layer is disposed between the light-shielding layer and the cover plate and has a third hollowed portion over the microstructure group. The first wavelength light is guided by the microstructure group and passes through the first hollowed portion, the third hollowed portion, and the first light-filtering layer to emit from the cover plate. Or the second wavelength light is guided by the microstructure group and passes through the first hollowed portion, the second light-filtering layer, and the second hollowed portion to emit from the cover plate.

In one or more embodiments of the present disclosure, the first light-filtering layer is configured to block the second wavelength light from passing through, and the second light-filtering layer is configured to block the first wavelength light from passing through.

In one or more embodiments of the present disclosure, the second hollowed portion presents a first pattern, and the third hollowed portion presents a second pattern, and wherein the first hollowed portion presents one of: the first pattern; the second pattern; and a third pattern composed of at least a union of the first pattern and the second pattern.

In one or more embodiments of the present disclosure, the light guide layer has a through hole configured to accommodate the light-emitting module.

In one or more embodiments of the present disclosure, the backlight module further includes a light reflective layer disposed between the circuit board and the light guide layer.

In one or more embodiments of the present disclosure, the microstructure group is located at a side of the light guide layer close to the light reflective layer.

In one or more embodiments of the present disclosure, the light-emitting module includes a first light-emitting element and a second light-emitting element. The first light-emitting element emits the first wavelength light, and the second light-emitting element emits the second wavelength light.

In one or more embodiments of the present disclosure, the first light-filtering layer and the second light-filtering layer are a light-filtering film or a light-filtering coating coated on the cover plate.

In one or more embodiments of the present disclosure, a wavelength of the first wavelength light and a wavelength of the second wavelength light are completely staggered.

In one or more embodiments of the present disclosure, a wavelength of the first wavelength light is within a range between 580 nanometers and 780 nanometers, and a wavelength of the second wavelength light is within a range between 435 nanometers and 579 nanometers.

In summary, in the backlight module of the present disclosure, since the first hollowed portion of the light-shielding layer, the second hollowed portion of the first light-filtering layer, and the third hollowed portion of the second light-filtering layer are all disposed corresponding to the microstructure group, both the first wavelength light and the second wavelength light can be guided by the microstructure group to emit upward and present patterns. In the backlight module of the present disclosure, since the patterned first light-filtering layer allows the first wavelength light to pass through while blocking the second wavelength light, and the patterned second light-filtering layer allows the second wavelength light to pass through while blocking the first wavelength light, the light-emitting module can present different patterns when emitting lights of different wavelengths without requiring an additional light guide layer. In conclusion, the backlight module of the present disclosure can effectively reduce the overall volume occupied by the backlight module.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
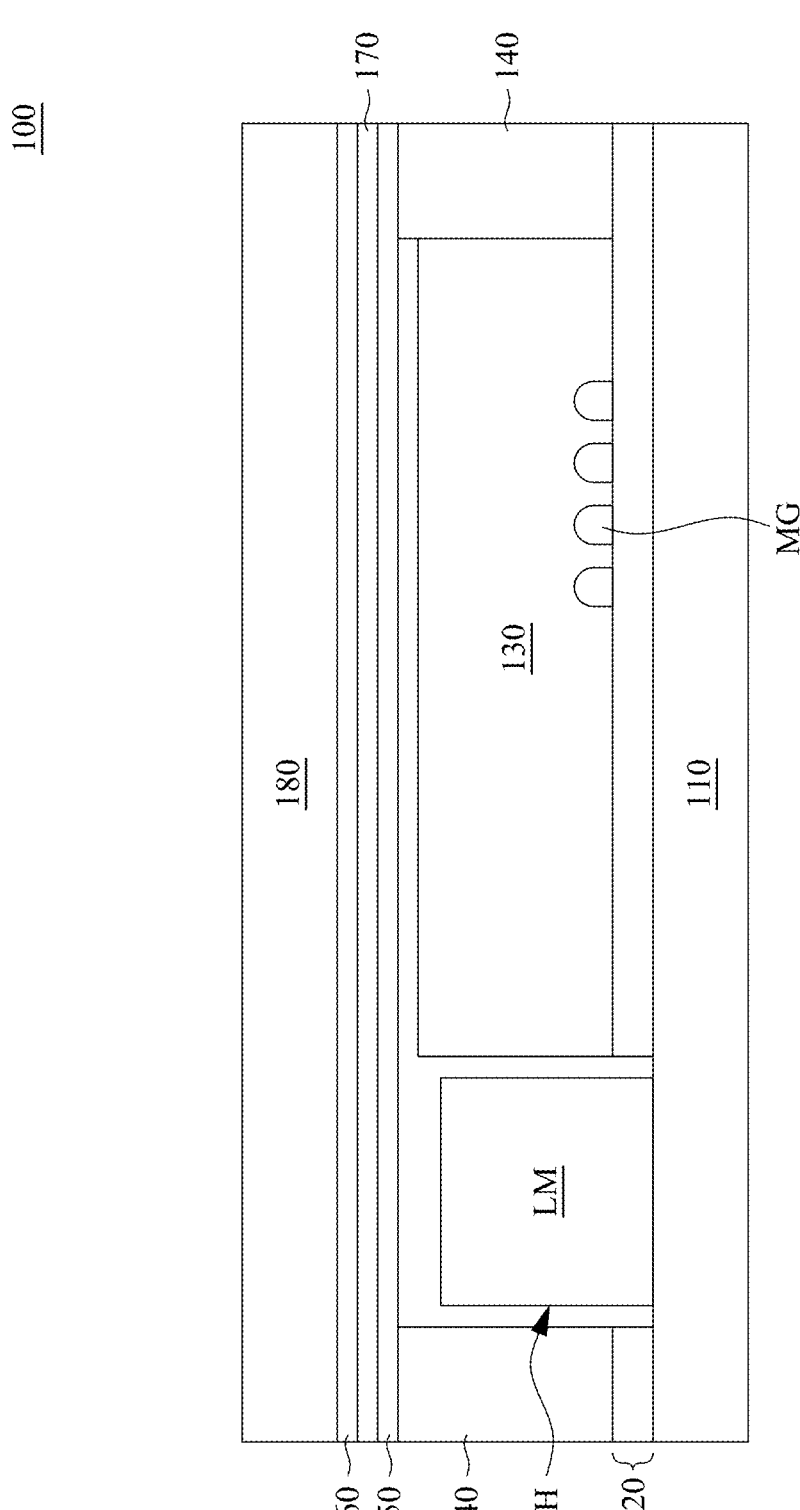
FIG. 1 is a schematic view of a backlight module in accordance with an embodiment of the present disclosure.

Hereinafter, a plurality of embodiments of the present disclosure will be disclosed in diagrams. For the sake of clarity, many details in practice will be described in the following description. However, it should be understood that these details in practice should not limit the present disclosure. In other words, in some embodiments of the present disclosure, these details in practice are unnecessary. In addition, for simplicity of the drawings, some conventionally used structures and elements will be shown in a simple schematic manner in the drawings. The same reference numbers are used in the drawings and the description to refer to the same or like parts.

Hereinafter, the structure and function of each component included in a backlight module 100 of this embodiment and the connection relationship between the components will be described in detail.

Reference is made to FIG. 1. FIG. 1 is a schematic view of a backlight module 100 in accordance with an embodiment of the present disclosure. As shown in FIG. 1, in this embodiment, a backlight module 100 is provided. The backlight module 100 includes a circuit board 110, a light reflective layer 120, a light guide layer 130, a light-emitting module LM, a light-partitioning portion 140, a light-shielding layer 150, a first light-filtering layer 160, a second light-filtering layer 170, and a cover plate 180. The light reflective layer 120 is disposed on the circuit board 110. The light guide layer 130 is disposed over the circuit board 110. In some embodiments, the light reflective layer 120 is disposed between the circuit board 110 and the light guide layer 130. The light guide layer 130 includes a microstructure group MG. Specifically, the microstructure group MG includes a plurality of microstructures configured to guide light. In some embodiments, the microstructure group MG is located at a side of the light guide layer 130 close to the light reflective layer 120. The light-emitting module LM is disposed on the circuit board 110 and configured to emit light. Specifically, the light guide layer 130 has a through hole TH, and the through hole TH is configured to accommodate the light-emitting module LM. In some embodiments, the light reflective layer 120 also has a through hole TH, such that the light-emitting module LM is located in the through hole TH and can be disposed on the circuit board 110. In some embodiments, the through hole TH of the light reflective layer 120 and the through hole TH of the light guide layer 130 correspond to each other in a direction (e.g., a top view direction).

In this embodiment, the light-partitioning portion 140 is disposed over the circuit board 110 and located at a side of the light guide layer 130 and a side of the light-emitting module LM. The light-partitioning portion 140 and the light guide layer 130 jointly define a space of the through hole TH. The light-partitioning portion 140 is configured to block light emitted from the light-emitting module LM to avoid light leakage. The light-shielding layer 150 is disposed over the light-emitting module LM. The cover plate 180 is disposed over the light-shielding layer 150. The first light-filtering layer 160 and the second light-filtering layer 170 are disposed between the light-shielding layer 150 and the cover plate 180. The first light-filtering layer 160 is located between the second light-filtering layer 170 and the cover plate 180. In some embodiments, when a manufacturer assembles the backlight module 100, the manufacturer may first dispose the light-shielding layer 150, the first light-filtering layer 160, and the second light-filtering layer 170 on the cover plate 180, and then cover the processed cover plate 180 over the light guide layer 130 and the light-emitting module LM.

In some embodiments, the light-emitting module LM may include, for example, a light emitting diode (LED) or other suitable light sources. In some embodiments, the light-emitting module LM may be, for example, a single RGB LED. However, the present disclosure is not intended to limit the type of the light-emitting module LM.

In some embodiments, the light-partitioning portion 140 is substantially opaque. In some embodiments, the light-partitioning portion 140 may be, for example, black polycarbonate (PC) or other opaque materials. However, the present disclosure is not intended to limit the material of the light-partitioning portion 140.

In some embodiments, the first light-filtering layer 160 and the second light-filtering layer 170 may be, for example, light-filtering films or light-filtering coatings coated on the cover plate 180. However, the present disclosure is not intended to limit the material of the first light-filtering layer 160 and the second light-filtering layer 170.

Figure 2:
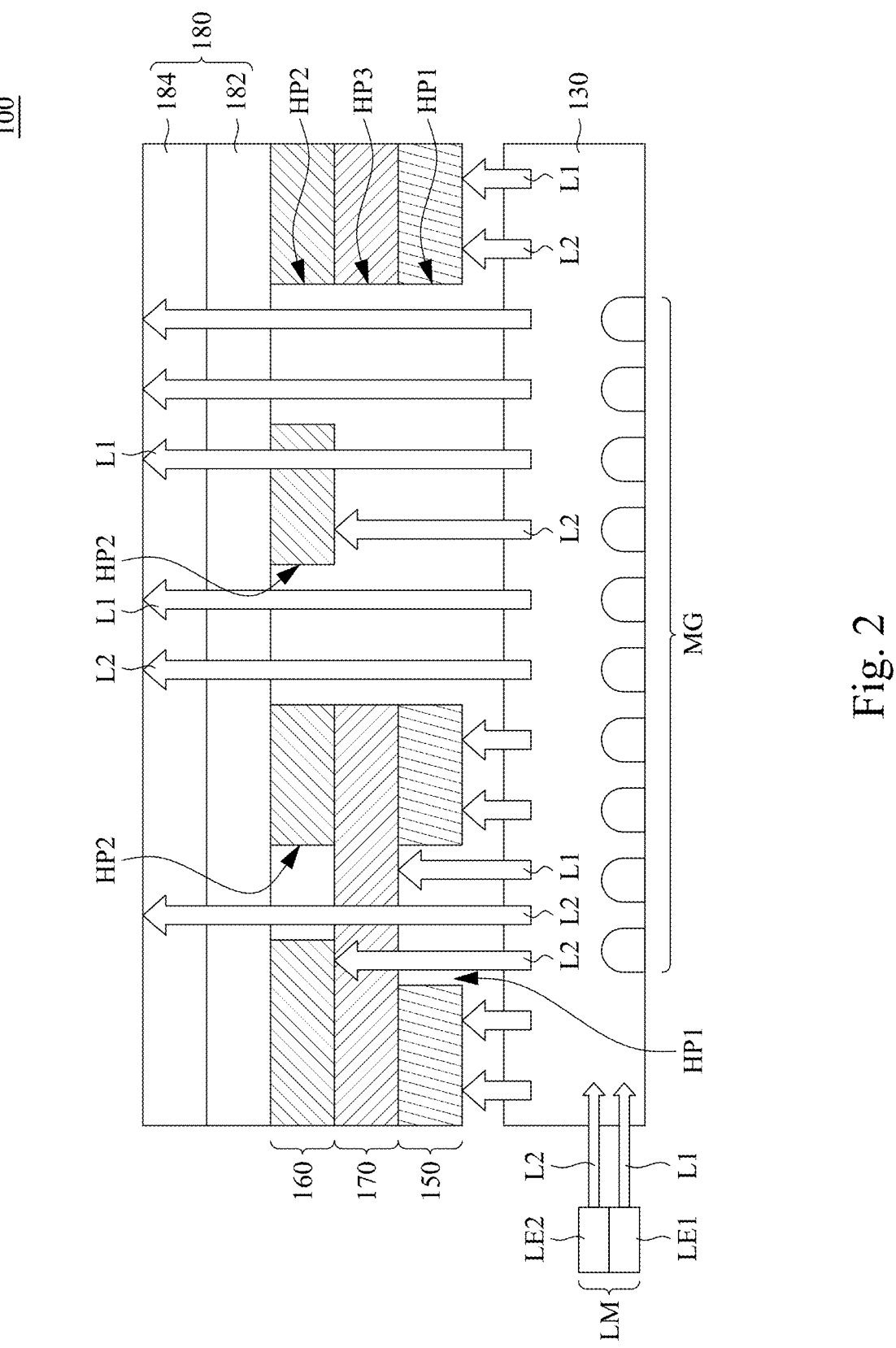
FIG. 2 is a schematic view of the backlight module in accordance with an embodiment of the present disclosure.

Reference is made to FIG. 2. FIG. 2 is a schematic view of the backlight module 100 in accordance with an embodiment of the present disclosure. For simplicity, the circuit board 110, the light reflective layer 120, and the light-partitioning portion 140 are omitted in FIG. 2. As shown in FIG. 2, in this embodiment, the light-emitting module LM is configured to emit a first wavelength light L1 and a second wavelength light L2. In some embodiments, the light-emitting module LM includes a first light-emitting element LE1 and a second light-emitting element LE2. The first light-emitting element LE1 emits the first wavelength light L1, and the second light-emitting element LE2 emits the second wavelength light L2. Specifically, the light-emitting module LM is not necessarily implemented by a single light-emitting element capable of emitting light of multiple wavelength ranges, but may be implemented by the first light-emitting element LE1 and the second light-emitting element LE2 that emit monochromatic lights. The wavelength of the first wavelength light L1 and the wavelength of the second wavelength light L2 are completely staggered. In some embodiments, the wavelength of the first wavelength light L1 is greater than the wavelength of the second wavelength light L2. In some embodiments, the wavelength of the first wavelength light L1 is within a range between 580 nanometers and 780 nanometers, and the wavelength of the second wavelength light L2 is within a range between 435 nanometers and 579 nanometers. In some embodiments, the first wavelength light L1 may be, for example, red light, and the second wavelength light L2 may be, for example, blue light.

Reference is made again to FIG. 2. As shown in FIG. 2, in this embodiment, the light-shielding layer 150 is configured to block the first wavelength light L1 and the second wavelength light L2, the first light-filtering layer 160 is configured to block the second wavelength light L2 from passing through, and the second light-filtering layer 170 is configured to block the first wavelength light L1 from passing through. The light-shielding layer 150 has a first hollowed portion HP1, the first light-filtering layer 160 has a second hollowed portion HP2, and the second light-filtering layer 170 has a third hollowed portion HP3. The first hollowed portion HP1, the second hollowed portion HP2, and the third hollowed portion HP3 are disposed corresponding to the microstructure group MG of the light guide layer 130. Specifically, in a vertical direction, the ranges of the first hollowed portion HP1, the second hollowed portion HP2, and the third hollowed portion HP3 are all generally within the range of the microstructure group MG. The cover plate 180 includes a translucent cover plate 182 and a transparent cover plate 184. The transparent cover plate 184 is disposed on the translucent cover plate 182, and the translucent cover plate 182 is located between the first light-filtering layer 160 and the transparent cover plate 184.

Overall, when the first wavelength light L1 is guided by the microstructure group MG to travel upward and reaches the light-shielding layer 150, the first wavelength light L1 is blocked by the light-shielding layer 150 and cannot emit from the cover plate 180. When the first wavelength light L1 travels upward and reaches the first hollowed portion HP1 of the light-shielding layer 150, the first wavelength light L1 passes through the first hollowed portion HP1. Next, when the first wavelength light L1 passes through the first hollowed portion HP1 and reaches the second light-filtering layer 170, the first wavelength light L1 is blocked by the second light-filtering layer 170 and cannot emit from the cover plate 180. If the first wavelength light L1 passes through the first hollowed portion HP1 and reaches the third hollowed portion HP3, the first wavelength light L1 passes through the third hollowed portion HP3. Next, when the first wavelength light L1 passes through the third hollowed portion HP3 and reaches the first light-filtering layer 160 or the second hollowed portion HP2, the first wavelength light L1 passes through the first light-filtering layer 160 or the second hollowed portion HP2 and can emit from the cover plate 180.

Similarly, when the second wavelength light L2 is guided by the microstructure group MG to travel upward and reaches the light-shielding layer 150, the second wavelength light L2 is blocked by the light-shielding layer 150 and cannot emit from the cover plate 180. When the second wavelength light L2 travels upward and reaches the first hollowed portion HP1 of the light-shielding layer 150, the second wavelength light L2 passes through the first hollowed portion HP1. Next, when the second wavelength light L2 passes through the first hollowed portion HP1 and reaches the second light-filtering layer 170 or the third hollowed portion HP3, the second wavelength light L2 passes through the second light-filtering layer 170 or the third hollowed portion HP3. Next, when the second wavelength light L2 passes through the second light-filtering layer 170 or the third hollowed portion HP3 and reaches the first light-filtering layer 160, the second wavelength light L2 is blocked by the first light-filtering layer 160 and cannot emit from the cover plate 180. If the second wavelength light L2 passes through the second light-filtering layer 170 or the third hollowed portion HP3 and reaches the second hollowed portion HP2, the second wavelength light L2 passes through the second hollowed portion HP2 and can emit from the cover plate 180.

In some embodiments, the light-shielding layer 150 may be, for example, a light-shielding black ink. In some embodiments, the first light-filtering layer 160 may be, for example, a red light-transmitting ink. In some embodiments, the second light-filtering layer 170 may be, for example, a blue light-transmitting ink. However, the present disclosure is not intended to limit the colors of the light-shielding layer 150, the first light-filtering layer 160, and the second light-filtering layer 170.

In some embodiments, the translucent cover plate 182 may be, for example, a translucent black cover plate. However, the present disclosure is not intended to limit the color of the translucent cover plate 182. In some embodiments, the transparent cover plate 184 may be, for example, a colorless transparent cover plate.

In some embodiments, the first light-emitting element LE1 and the second light-emitting element LE2 may be, for example, light emitting diodes (LEDs) or other suitable light sources. However, the present disclosure is not intended to limit the types of the first light-emitting element LE1 and the second light-emitting element LE2.

Figure 3:
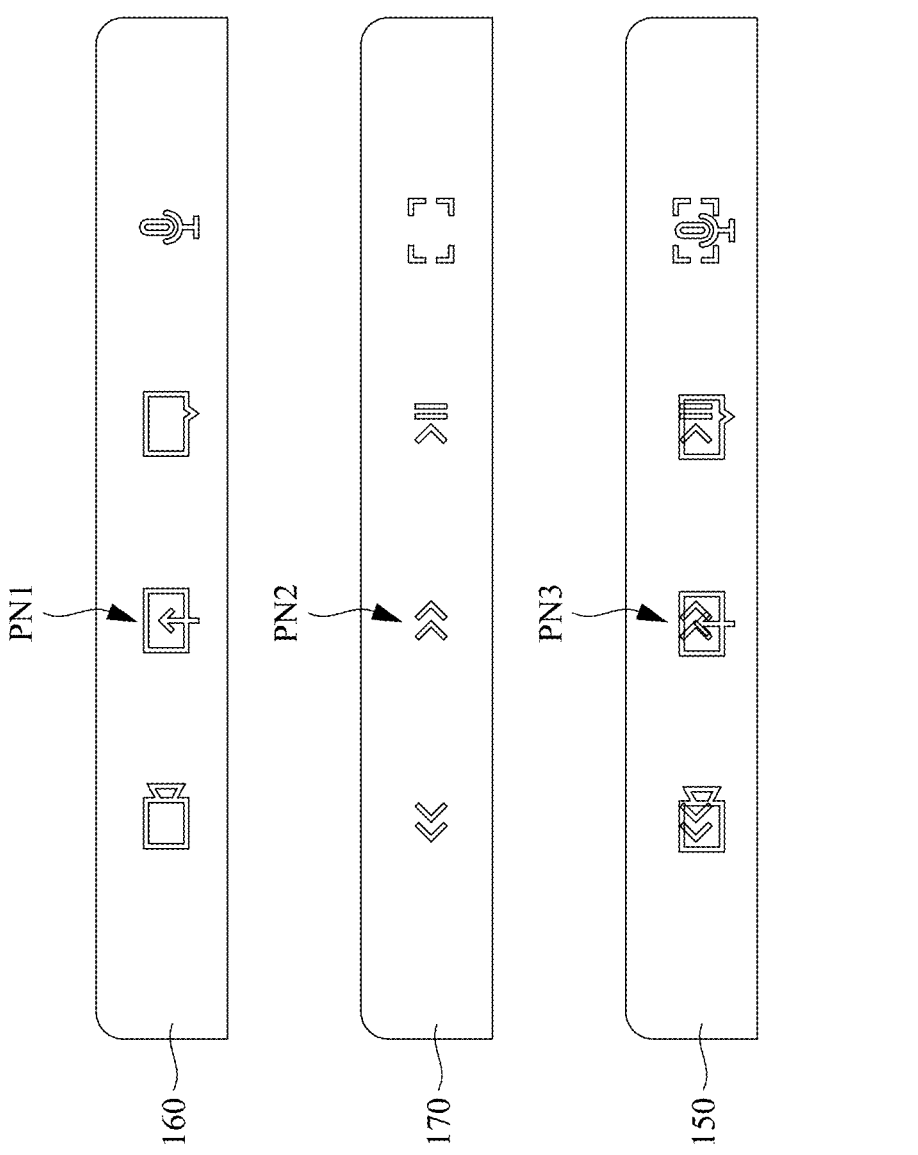
FIG. 3 is a schematic view of a first pattern, a second pattern, and a third pattern in accordance with an embodiment of the present disclosure.

Reference is made to FIG. 3. FIG. 3 is a schematic view of a first pattern PN1, a second pattern PN2, and a third pattern PN3 in accordance with an embodiment of the present disclosure. As shown in FIG. 3, in this embodiment, the first light-filtering layer 160 has the first pattern PN1, the second light-filtering layer 170 has the second pattern PN2, and the light-shielding layer 150 has the third pattern PN3. Each of the first pattern PN1, the second pattern PN2, and the third pattern PN3 includes a plurality of icons, and the icons of the first pattern PN1, the second pattern PN2, and the third pattern PN3 correspond to each other in a direction (e.g., a vertical direction). Specifically, as shown in FIG. 2 and FIG. 3, the second hollowed portion HP2 of the first light-filtering layer 160 presents the first pattern PN1, the third hollowed portion HP3 of the second light-filtering layer 170 presents the second pattern PN2, and the first hollowed portion HP1 of the light-shielding layer 150 presents the third pattern PN3. Specifically, the third pattern PN3 is composed of at least a union of the first pattern PN1 and the second pattern PN2. In some other embodiments, the first hollowed portion HP1 of the light-shielding layer 150 may also present the first pattern PN1 or the second pattern PN2 to achieve a specific pattern effect.

Figure 4:
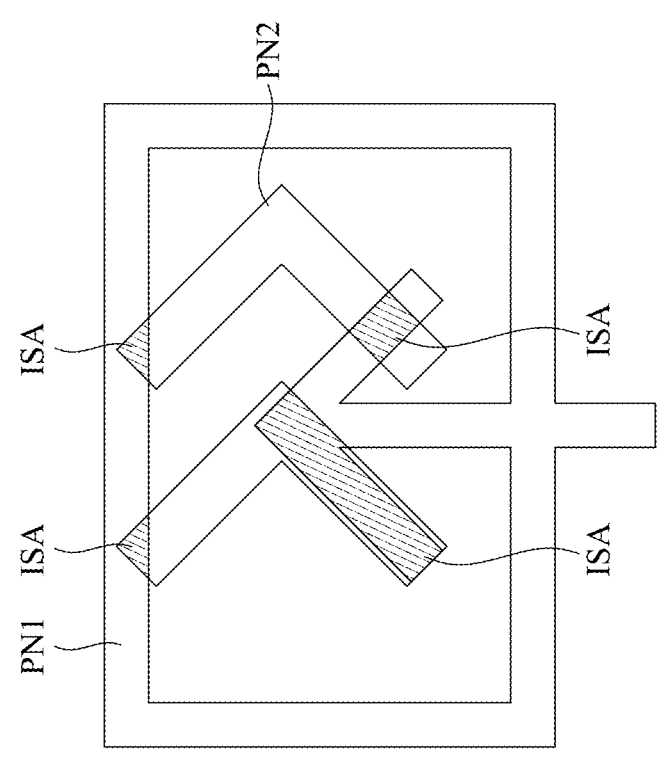
FIG. 4 is a schematic view of the third pattern in accordance with an embodiment of the present disclosure.

Reference is made to FIG. 4. FIG. 4 is a schematic view of the third pattern PN3 in accordance with an embodiment of the present disclosure. As shown in FIG. 4, in this embodiment, the first hollowed portion HP1 is formed by a union of the second hollowed portion HP2 and the third hollowed portion HP3. The third pattern PN3 includes an intersection area ISA of the first pattern PN1 and the second pattern PN2. As shown in FIG. 2 to FIG. 4, the intersection area ISA corresponds to a region in which the first hollowed portion HP1, the second hollowed portion HP2, and the third hollowed portion HP3 overlap in the vertical direction. Since the intersection area ISA is hollowed, when the light-emitting module LM emits the first wavelength light L1 or the second wavelength light L2, the complete second pattern PN2 and the complete first pattern PN1 can be respectively presented.

Figure 5:
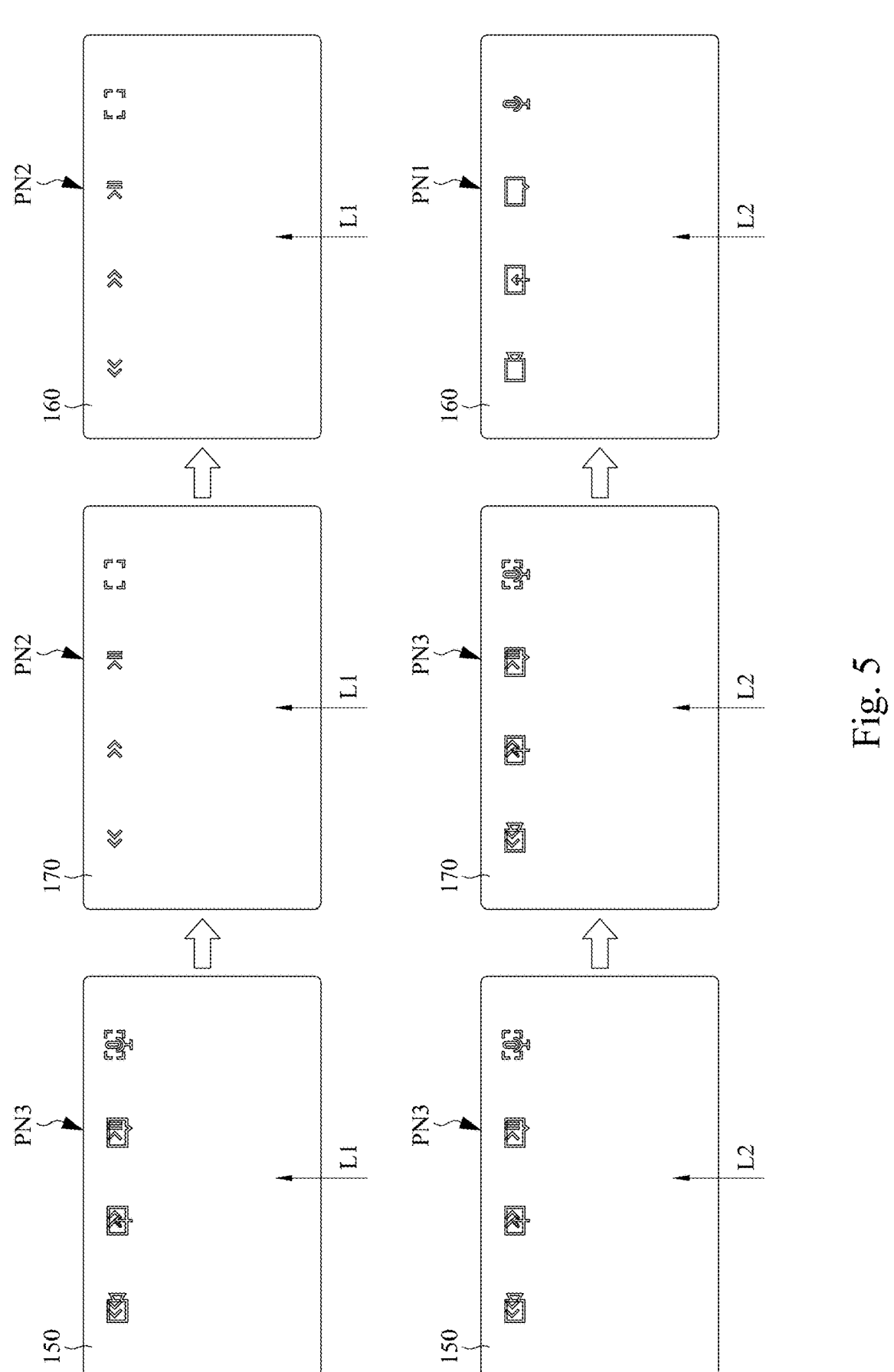
FIG. 5 is a schematic view in which a first wavelength light and a second wavelength light sequentially pass through a light-shielding layer, a second light-filtering layer, and a first light-filtering layer in accordance with an embodiment of the present disclosure.

Reference is made to FIG. 5. FIG. 5 is a schematic view in which the first wavelength light L1 and the second wavelength light L2 sequentially pass through the light-shielding layer 150, the second light-filtering layer 170, and the first light-filtering layer 160 in accordance with an embodiment of the present disclosure. FIG. 5 depicts, from left to right, the patterns presented when the first wavelength light L1 and the second wavelength light L2 sequentially pass through the light-shielding layer 150, the second light-filtering layer 170, and the first light-filtering layer 160. As shown in FIG. 2 to FIG. 5, in this embodiment, when the light-emitting module LM itself or the first light-emitting element LE1 of the light-emitting module LM emits the first wavelength light L1, the first wavelength light L1 is guided to travel upward by the microstructure group MG of the light guide layer 130 and reaches the light-shielding layer 150. The light-shielding layer 150 blocks the first wavelength light L1 from passing through, while the first hollowed portion HP1 allows the first wavelength light L1 to pass through, so that the first wavelength light L1 presents the third pattern PN3 when passing through the light-shielding layer 150. Next, when the first wavelength light L1 enters the second light-filtering layer 170 from the light-shielding layer 150, the second light-filtering layer 170 blocks the first wavelength light L1 from passing through, while the third hollowed portion HP3 allows the first wavelength light L1 to pass through, so that the first wavelength light L1 presents the second pattern PN2 when passing through the second light-filtering layer 170. Next, when the first wavelength light L1 enters the first light-filtering layer 160 from the second light-filtering layer 170, even though the first light-filtering layer 160 has the second hollowed portion HP2 presenting the first pattern PN1 (referring to FIG. 2 and FIG. 3), the first light-filtering layer 160 completely allows the first wavelength light L1 to pass through, so that the first wavelength light L1 still presents the second pattern PN2 when passing through the first light-filtering layer 160.

Similarly, as shown in FIG. 2 to FIG. 5, when the light-emitting module LM itself or the second light-emitting element LE2 of the light-emitting module LM emits the second wavelength light L2, the second wavelength light L2 is guided to travel upward by the microstructure group MG of the light guide layer 130 and reaches the light-shielding layer 150. The light-shielding layer 150 blocks the second wavelength light L2 from passing through, while the first hollowed portion HP1 allows the second wavelength light L2 to pass through, so that the second wavelength light L2 presents the third pattern PN3 when passing through the light-shielding layer 150. Next, when the second wavelength light L2 enters the second light-filtering layer 170 from the light-shielding layer 150, the second light-filtering layer 170 completely allows the second wavelength light L2 to pass through, so that the second wavelength light L2 still presents the third pattern PN3 when passing through the second light-filtering layer 170. Next, when the second wavelength light L2 enters the first light-filtering layer 160 from the second light-filtering layer 170, the first light-filtering layer 160 blocks the second wavelength light L2 from passing through, while the second hollowed portion HP2 allows the second wavelength light L2 to pass through, so that the second wavelength light L2 presents the first pattern PN1 when passing through the first light-filtering layer 160.

By the aforementioned structural configuration, as shown in FIG. 2 to FIG. 5, since the second hollowed portion HP2 of the first light-filtering layer 160 and the third hollowed portion HP3 of the second light-filtering layer 170 respectively have the first pattern PN1 and the second pattern PN2 that are different from each other, and the intersection area ISA of the first pattern PN1 and the second pattern PN2 corresponds to a region where the first hollowed portion HP1, the second hollowed portion HP2, and the third hollowed portion HP3 overlap, the backlight module 100 only needs one light guide layer 130 to enable the first wavelength light L1 and the second wavelength light L2 to respectively present different patterns, thereby achieving the effect of a single-layer dual-mode.

From the above detailed description of the specific embodiments of the present disclosure, it can be clearly seen that in the backlight module of the present disclosure, since the first hollowed portion of the light-shielding layer, the second hollowed portion of the first light-filtering layer, and the third hollowed portion of the second light-filtering layer are all disposed corresponding to the microstructure group, both the first wavelength light and the second wavelength light can be guided by the microstructure group to emit upward and present patterns. In the backlight module of the present disclosure, since the patterned first light-filtering layer allows the first wavelength light to pass through while blocking the second wavelength light, and the patterned second light-filtering layer allows the second wavelength light to pass through while blocking the first wavelength light, the light-emitting module can present different patterns when emitting lights of different wavelengths without requiring an additional light guide layer. In conclusion, the backlight module of the present disclosure can effectively reduce the overall volume occupied by the backlight module.

Although the present disclosure has been described with reference to the above embodiments, it is not intended to limit the present disclosure. Various modifications and refinements may be made by those skilled in the art without departing from the spirit and scope of the present disclosure. Therefore, the scope of protection of the present disclosure shall be defined by the appended claims.

What is claimed is:

1. A backlight module, comprising:
a circuit board;
a light guide layer disposed over the circuit board and comprising a microstructure group;
a light-emitting module disposed on the circuit board and configured to emit a first wavelength light and a second wavelength light;
a light-shielding layer disposed over the light-emitting module and having a first hollowed portion disposed corresponding to the microstructure group;
a cover plate disposed over the light-shielding layer;
a first light-filtering layer disposed between the light-shielding layer and the cover plate and having a second hollowed portion corresponding to the microstructure group; and
a second light-filtering layer disposed between the light-shielding layer and the cover plate and having a third hollowed portion corresponding to the microstructure group,
wherein the first wavelength light is guided by the microstructure group and passes upward through the first hollowed portion, the third hollowed portion, and the first light-filtering layer to emit from the cover plate, or the second wavelength light is guided by the microstructure group and passes upward through the first hollowed portion, the second light-filtering layer, and the second hollowed portion to emit from the cover plate.

2. The backlight module of claim 1, wherein the first light-filtering layer is configured to block the second wavelength light from passing through, and the second light-filtering layer is configured to block the first wavelength light from passing through.

3. The backlight module of claim 1, wherein the second hollowed portion presents a first pattern, and the third hollowed portion presents a second pattern, and wherein the first hollowed portion presents one of:
the first pattern;
the second pattern; and
a third pattern composed of at least a union of the first pattern and the second pattern.

4. The backlight module of claim 1, wherein the light guide layer has a through hole configured to accommodate the light-emitting module.

5. The backlight module of claim 1, further comprising a light reflective layer disposed between the circuit board and the light guide layer.

6. The backlight module of claim 5, wherein the microstructure group is located at a side of the light guide layer close to the light reflective layer.

7. The backlight module of claim 1, wherein the light-emitting module comprises a first light-emitting element and a second light-emitting element, the first light-emitting element emits the first wavelength light, and the second light-emitting element emits the second wavelength light.

8. The backlight module of claim 1, wherein the first light-filtering layer and the second light-filtering layer are a light-filtering film or a light-filtering coating coated on the cover plate.

9. The backlight module of claim 1, wherein a wavelength of the first wavelength light and a wavelength of the second wavelength light are completely staggered.

10. The backlight module of claim 1, wherein a wavelength of the first wavelength light is within a range between 580 nanometers and 780 nanometers, and a wavelength of the second wavelength light is within a range between 435 nanometers and 579 nanometers.

11. A backlight module, comprising:
a circuit board;
a light guide layer disposed over the circuit board and comprising a microstructure group;
a light-emitting module disposed on the circuit board and configured to emit a first wavelength light and a second wavelength light;
a light-shielding layer disposed over the light-emitting module and having a first hollowed portion disposed over the microstructure group;
a cover plate disposed over the light-shielding layer;
a first light-filtering layer disposed between the light-shielding layer and the cover plate and having a second hollowed portion over the microstructure group; and
a second light-filtering layer disposed between the light-shielding layer and the cover plate and having a third hollowed portion over the microstructure group,
wherein the first wavelength light is guided by the microstructure group and passes through the first hollowed portion, the third hollowed portion, and the first light-filtering layer to emit from the cover plate, or the second wavelength light is guided by the microstructure group and passes through the first hollowed portion, the second light-filtering layer, and the second hollowed portion to emit from the cover plate.

12. The backlight module of claim 11, wherein the first light-filtering layer is configured to block the second wavelength light from passing through, and the second light-filtering layer is configured to block the first wavelength light from passing through.

13. The backlight module of claim 11, wherein the second hollowed portion presents a first pattern, and the third hollowed portion presents a second pattern, and wherein the first hollowed portion presents one of:
the first pattern;
the second pattern; and
a third pattern composed of at least a union of the first pattern and the second pattern.

14. The backlight module of claim 11, wherein the light guide layer has a through hole configured to accommodate the light-emitting module.

15. The backlight module of claim 11, further comprising a light reflective layer disposed between the circuit board and the light guide layer.

16. The backlight module of claim 15, wherein the microstructure group is located at a side of the light guide layer close to the light reflective layer.

17. The backlight module of claim 11, wherein the light-emitting module comprises a first light-emitting element and a second light-emitting element, the first light-emitting element emits the first wavelength light, and the second light-emitting element emits the second wavelength light.

18. The backlight module of claim 11, wherein the first light-filtering layer and the second light-filtering layer are a light-filtering film or a light-filtering coating coated on the cover plate.

19. The backlight module of claim 11, wherein a wavelength of the first wavelength light and a wavelength of the second wavelength light are completely staggered.

20. The backlight module of claim 11, wherein a wavelength of the first wavelength light is within a range between 580 nanometers and 780 nanometers, and a wavelength of the second wavelength light is within a range between 435 nanometers and 579 nanometers.

* * * * *